United States Patent [19]

Kajima et al.

[11] Patent Number: 5,539,049
[45] Date of Patent: Jul. 23, 1996

[54] AQUEOUS RESIN DISPERSION

[75] Inventors: Junichi Kajima, Hiratsuka; Masaru Mitsuji, Zama; Mitsugu Endo; Yasuo Takaya, both of Kanagawa-ken, all of Japan

[73] Assignee: Kansai Paint Company Limited, Amagasaki, Japan

[21] Appl. No.: 247,579

[22] Filed: May 23, 1994

[30] Foreign Application Priority Data

May 24, 1993 [JP] Japan ................................. 5-146867

[51] Int. Cl.$^6$ ........................... C08L 61/28; C08L 33/02
[52] U.S. Cl. ........................... 525/66; 525/519; 525/524; 525/598
[58] Field of Search ................. 525/66, 519; 524/598

[56] References Cited

U.S. PATENT DOCUMENTS

| | | | |
|---|---|---|---|
| 3,993,716 | 11/1976 | Klein et al. | 260/885 |
| 4,659,781 | 4/1987 | Okude et al. | 525/279 |
| 5,231,131 | 7/1993 | Chu et al. | 524/504 |

*Primary Examiner*—W. Robinson H. Clark
*Attorney, Agent, or Firm*—Armstrong, Westerman, Hattori, McLeland & Naughton

[57] ABSTRACT

Disclosed is an aqueous resin dispersion prepared by dispersing in an aqueous medium a graft resin (A) and a hydrophobic melamine resin (B), said graft resin (A) having a weight average molecular weight of 10,000 to 100,000 and an acid value of 5 to 80, and consisting of a hydrophobic main chain moiety and a hydrophilic side chain moiety, said hydrophilic side chain moiety being 5,000 to 50,000 in weight average molecular weight and at least 20 in acid value.

3 Claims, No Drawings

AQUEOUS RESIN DISPERSION

The present invention relates to an aqueous dispersion of hydrophobic melamine resin, the dispersion being useful as a crosslinking agent for aqueous coating compositions and being excellent in storage stability, thermal stability and mechanical stability.

Aqueous dispersions are known which are prepared by dispersing in water a hydrophobic melamine resin in the presence of a water-soluble resin serving as a dispersion stabilizer. Water-soluble resins useful in the preparation of the aqueous dispersion include acrylic resins, alkyd resins, epoxy resins and the like which have hydrophilic groups, e.g. carboxyl and amino groups. Many of these resins are of straight-chain structure.

However, such aqueous resin dispersions have drawbacks. The dispersions are markedly decreased in viscosity during storage at room temperature or elevated temperatures or on exposure to a mechanical load, consequently tending to cause sagging or popping, when used for a coating composition. The dispersions are also disadvantageous in becoming thickened because of a large amount of the water-soluble resin used for dispersing in water the hydrophobic melamine resin. The thickened dispersions are likely to induce insufficient atomization when used for a spray coating composition and are therefore undesirable.

An object of the present invention is to provide a novel aqueous resin dispersion free of the drawbacks of conventional aqueous dispersions of hydrophobic melamine resins.

Another object of the present invention is to provide a novel aqueous resin dispersion which is excellent in storage stability, thermal stability and mechanical stability.

These and other objects of the invention will become more apparent from the following description.

According to the present invention, there is provided an aqueous resin dispersion prepared by dispersing in an aqueous medium a graft resin (A) and a hydrophobic melamine resin (B), said graft resin (A) having a weight average molecular weight of 10,000 to 100,000 and an acid value of 5 to 80, and consisting of a hydrophobic main chain moiety and a hydrophilic side chain moiety, said hydrophilic side chain moiety being 5,000 to 50,000 in weight average molecular weight and at least 20 in acid value.

The present inventors conducted extensive research to overcome the drawbacks of conventional aqueous dispersions of hydrophobic melamine resins and found that when said specific graft resin is used as a stabilizer for dispersing the hydrophobic melamine resin, the resulting dispersion is markedly improved in storage stability, thermal stability and mechanical stability, and the amount of said graft resin to be used as the dispersion stabilizer can be reduced.

The present invention has been completed on the basis of these novel findings.

The graft resin (A) and the hydrophobic melamine resin (B) which are used in the invention will be described below.

The graft resin (A), which is used to uniformly disperse the hydrophobic melamine resin (B) in water, has a weight average molecular weight of 10,000 to 100,000, and an acid value of 5 to 80 and consists of a hydrophobic main chain moiety and a hydrophilic side chain moiety. The hydrophilic side chain moiety is 5,000 to 50,000 in weight average molecular weight and at least 20 in acid value.

The resin skeletons constituting the main chain and side chain moieties of the graft resin (A) are not specifically limited and may be each comprised of at least one member selected from the group consisting of acrylic resins, polyester resins, polyurethane resins and epoxy resins. The resin skeletons of the main chain and side chain moieties may be the same or different.

It is preferred in the present invention to use the graft resin (A) with the main chain and side chain moieties composed of an acrylic resin. Next, the acrylic resins useful for the main chain and side chain moieties will be chiefly described.

The acrylic resin constituting the main chain moiety is of a hydrophobic nature. The main chain moiety can be prepared by polymerizing an acrylic monomer.

Acrylic monomers useful for the main chain moiety include, for example, carboxyl-free compounds which have one polymerizable unsaturated double bond per molecule. Examples of carboxyl-free acrylic monomers are monoesters of acrylic or methacrylic acid with a monohydric alcohol having 1 to 20 carbon atoms such as methyl (meth)acrylate, ethyl (meth)acrylate, propyl (meth)acrylate, butyl (meth)acrylate, hexyl (meth)acrylate, 2-ethylhexyl (meth)acrylate, lauryl (meth)acrylate, cyclohexyl (meth)acrylate, etc., $C_{2-18}$ alkoxy alkyl esters of acrylic or methacrylic acid such as methoxybutyl (meth)acrylate, methoxyethyl (meth)acrylate, ethoxybutyl (meth)acrylate, ethoxypropyl (meth)acrylate, etc., hydroxyl-containing acrylic monomers, e.g. $C_{2-8}$ hydroxy alkyl esters of acrylic or methacrylic acid such as 2-hydroxyethyl (meth)acrylate, hydroxybutyl (meth)acrylate, hydroxypropyl (meth)acrylate, etc., glycidyl group-containing monomers such as glycidyl (meth)acrylate, etc., and (meth)acrylamide, N-methylol (meth)acrylamide, N-methoxymethyl (meth)acrylamide and like nitrogen-containing acrylic monomers, etc. These monomers can be used singly or in mixture with each other.

When required, a carboxyl-containing acrylic monomer can be used conjointly with the carboxyl-free acrylic monomer for the main chain moiety. The carboxyl-containing acrylic monomer to be optionally used is a compound which contains at least one carboxyl group and a single polymerizable unsaturated double bond, per molecule. Such monomers include, for example, acrylic acid, methacrylic acid, itaconic acid, etc. The carboxyl-containing acrylic monomer can be used in such an amount that the main chain moiety is not higher in acid value than the side chain moiety.

Said acrylic monomers can be used conjointly with styrene, styrene derivatives, (meth)acrylonitrile, vinyl acetate, vinyl chloride, ethyl vinyl ether, vinyl ketone, vinyl toluene or like vinyl monomers.

The side chain moiety of the graft resin (A) is composed chiefly of an acrylic resin. The side chain moiety is of a hydrophilic nature and has a weight average molecular weight of 5,000 to 50,000, preferably 15,000 to 30,000 and an acid value of at least 20, preferably 30 to 110.

The acrylic resin constituting the side chain moiety can be prepared by copolymerizing a carboxyl-containing acrylic monomer and a carboxyl-free acrylic monomer. These monomers include those exemplified above for the main chain moiety.

If the side chain moiety has a weight average molecular weight outside the range of 5,000 to 50,000 or an acid value of less than 20, the obtained aqueous resin dispersion is degraded in stabilities and may bring about a phase separation during storage.

The main chain and side chain moieties both composed of acrylic resins in the graft resin (A) are chemically bonded to each other. The bonding methods are not specifically limited and include, for example:

(1) a method comprising reacting a glycidyl group in a glycidyl group-containing acrylic monomer with some of carboxyl groups in the main chain moiety to introduce therein a polymerizable double bond, and copolymerizing the double bond with a monomer component for forming the side chain moiety;

(2) a method comprising reacting a glycidyl group in a glycidyl group-containing acrylic monomer with some of carboxyl groups in the side chain moiety to introduce therein a polymerizable double bond, and copolymerizing the double bond with a monomer component for forming the main chain moiety;

(3) a method comprising reacting one of two isocyanate groups in a diisocyanate compound with some or all of hydroxyl groups in the main chain moiety, reacting the remaining isocyanate group with a hydroxyl-containing acrylic monomer to introduce therein a polymerizable double bond, and copolymerizing the double bond with a monomer component for forming the side chain moiety; and (4) a method comprising reacting a diisocyanate compound with some or all of hydroxyl groups in the side chain moiety in a substantially equal molar ratio, reacting the remaining isocyanate group with a hydroxyl-containing acrylic monomer to introduce therein a polymerizable double bond, and copolymerizing the double bond with a monomer component for forming the main chain moiety.

The diisocyanate compounds used in the methods (3) and (4) have two isocyanate groups per molecule and include, for example, aliphatic diisocyanates such as hexamethylene diisocyanate, trimethylhexamethylene diisocyanate, etc., cyclic aliphatic diisocyanates such as hydrogenated xylylene diisocyanate, isophorone diisocyanate, etc. and aromatic diisocyanates such as tolylene diisocyanate, diphenylmethane diisocyanate, etc.

The ratio (by weight) of the main chain moiety to the side chain moiety in the graft resin (A) is 70/30 to 30/70, preferably 60/40 to 40/60, based on the combined weight of the moieties.

The resin (A) outside said range in the ratio of two moieties is undesirable, because the obtained aqueous resin dispersion may induce a phase separation during storage. The weight average molecular weight of the graft resin (A) consisting of the main chain and side chain moieties is in the range of 10,000 to 100,000, preferably 20,000 to 80,000. If the resin (A) has a weight average molecular weight of less than 10,000, the dispersion used for a coating composition impairs coating properties, whereas if the resin (A) has a weight average molecular weight of more than 100,000, the dispersion used for a coating composition deteriorates the appearance of coating film. Hence the resin (A) with a molecular weight outside said range is undesirable.

The graft resin (A) has an acid value of 5 to 80, preferably 25 to 60. If the resin (A) with an acid value of less than 5 is used, the aqueous dispersion is deteriorated in the stability and is likely to bring about a phase separation. On the other hand, if the resin (A) with an acid value of more than 80, the coating composition containing the obtained dispersion gives a coating film degraded in water resistance, metallic effect, flatness, surface smoothness, etc. Thus the resin (A) outside said acid value range is undesirable.

It is preferred to neutralize the graft resin (A) with a neutralizing agent before it is mixed with the hydrophobic melamine resin (B). Useful neutralizing agents include alkyl amines such as monomethylamine, dimethylamine, trimethylamine, monoethylamine, dibutylamine, tripropylamine, etc., alkanolamines such as monoethanolamine, diethanolamine, mono(2-hydroxypropyl)amine, 2-amino-2-methyl-1-propanol, dimethylaminoethanol, diethylaminoethanol, etc., alkylenepolyamines such as ethylenediamine, diethylenetriamine, triethylenetetramine, etc., alkyleneimines such as ethyleneimine, propyleneimine, etc. and piperazine, morpholine, pyridine, etc. Among them, alkanolamines are preferred.

It is suitable to use the hydrophobic melamine resin (B) which is 400 to 5,000, preferably 700 to 3,000 in weight average molecular weight and up to 20, favorably 1 to 18 in solvent dilution ratio when diluted with a water/methanol solvent mixture (35/65 in weight ratio).

The melamine resin (B) is not specifically limited insofar as the resin (B) has a molecular weight in said range and a solvent dilution ratio in said range. Examples of the resin (B) include melamine resins etherified with at least one of monohydric alcohols such as methyl alcohol, ethyl alcohol, isopropyl alcohol, n-butyl alcohol, isobutyl alcohol, octyl alcohol, 2-ethylhexyl alcohol and benzyl alcohol, etc.

The etherification is advantageously effected using at least one monohydric alcohol having at least 4 carbon atoms, preferably 4 to 7 carbon atoms. While the amount of ether group in the melamine resin (B) is not critical in the present invention, a suitable amount is up to 5 moles, preferably about 1.5 to about 3 moles, per triazine ring. Proper amounts of amino, imino and methylol groups can be present in the resin (B) insofar as the resin (B) can meet the requirements for the solvent dilution ratio range and the molecular weight range. Usually the amounts of amino, imino and methylol groups are each 0.2 to 2.0 moles, preferably 0.5 to 1.5 moles, per triazine ring.

The solvent dilution ratio of the hydrophobic melamine resin (B) is an index indicating the solubility of the resin (B) in the hydrophilic solvent. The lower the solvent dilution ratio, the more hydrophobic the resin (B) is. The solvent dilution ratio of the resin (B) can be measured by a method comprising charging 2 g of the resin (B) into a 50 cc beaker, placing the beaker on a sheet of paper printed with a No. 5 type and adding dropwise a water/methanol solvent mixture (35/65 in weight ratio) with stirring at a temperature of 25° C. until the print becomes illegible. The ratio can be calculated by dividing the amount (cc) of the added solvent mixture by the amount of the resin (B) used (co/g).

If the hydrophobic melamine resin (B) is less than 400 in weight average molecular weight, the aqueous dispersion of said resin (B) used for a coating composition tends to impair coating properties (e.g. water resistance). On the other hand, if the resin (B) is more than 5,000 in weight average molecular weight, the dispersion of said resin (B) used for a coating composition is likely to degrade the appearance of coating film. Thus the resin (B) outside said range of weight average molecular weight is undesirable. If the resin (B) has a solvent dilution ratio of more than 20, the coating composition containing the resulting dispersion is liable to impair coating properties and to sag when applied at a high humidity. Namely the resin (B) outside said range of solvent dilution ratio is undesirable.

The aqueous resin dispersion of this invention can be prepared by dispersing in water the graft resin (A) and the hydrophobic melamine resin (B). Stated more specifically, the two components are homogeneously mixed by means such as a dispersing mixer, homogenizing mixer, ball mill, sand mill or the like. When required, a coloring pigment, metallic pigment, extender pigment, etc. can be combined with the two components, and a small amount of a hydrophilic solvent such as an alcohol solvent or an ether solvent can be added. Then, deionized water is gradually added with vigorous stirring in an amount of about 0.5 to about 5 times the combined weight of the resins (A) and (B), whereby a milky white or discolored aqueous dispersion is produced. The particles in the pigment-free aqueous resin dispersion are about 0.05 to about 0.5µm in average particle size. The extent of stirring to be executed in adding the deionized water can be suitably selected depending on the kind of the stirrer employed and the amounts of the components used. For example, when a dispersing mixer operable at about 1,000 to about 1,500 rpm is used, stirring is effected for about 15 to about 60 minutes.

Examples of the pigment to be added to the aqueous resin dispersion are metallic pigments and coloring pigments which are conventionally used in the field of coating compositions. Specific examples of metallic pigments are aluminum flakes, copper-bronze flakes, etc. Specific examples of coloring pigments are inorganic pigments such as titanium dioxide, iron oxide, chromium oxide, lead chromate, carbon black, etc., and organic pigments such as phthalocyanine blue, phthalocyanine green, carbazole violet, anthrapyrimidine yellow, flavanthrone yellow, isoindoline yellow, indanthrone blue, quinacridone violet, etc.

As to the proportions of the graft resin (A) and the hydrophobic melamine resin (B), it is suitable to use about 4 to about 40 parts by weight, preferably about 8 to about 32 parts by weight, of the resin (A) per 20 parts by weight of solids of the resin (B). Less than 4 parts by weight of the graft resin (A) used is likely to increase the average particle size of the resin (B) in the aqueous dispersion and to degrade the storage stability of the dispersion. More than 40 parts by weight of the resin (A) used tends to impair the storage stability of the dispersion although with substantially no change in the average particle size of the resin (B) in the dispersion.

The aqueous resin dispersion of this invention is a composition prepared by dispersing in an aqueous medium the graft resin (A) and the hydrophobic melamine resin (B) with stirring. The composition is in the following state. Presumably the main chain moiety (hydrophobic) of the graft resin (A) is adsorbed on the surface of particles of hydrophobic melamine resin (B) while the side chain moiety (hydrophilic) of the graft resin (A) is present on the side of aqueous phase. In other words, the particles of the resin (B) are protected with the graft resin (A) and are stably dispersed in water due to the hydrophilic moiety of the resin (A).

According to the present invention, the hydrophobic melamine resin (B) is dispersed in water using the graft resin (A) as a dispersion stabilizer in place of conventional water-soluble resins, thereby giving a dispersion which is pronouncedly improved in storage stability, mechanical stability and thermal stability. In preparing the dispersion of the invention, the amount of the resin (A) required for dispersing the resin (B) in water can be so reduced that the viscosity of dispersion can be decreased and the coating composition containing the dispersion can be easily atomized in spray coating.

The present invention will be described below in more detail with reference to Preparation Examples, Examples and Comparative Examples wherein the parts and percentages are all by weight.

Preparation Example 1: Preparation of graft resin (A-1)

Ethylene glycol monobutyl ether (60 parts) was placed in a reactor and heated to 120° C. in a stream of nitrogen. When the temperature was elevated to 120° C., a mixture of 25 parts of methyl methacrylate, 48 parts of n-butyl acrylate, 15 parts of 2-hydroxyethyl acrylate, 12 parts of acrylic acid and 2.5 parts of azobisisobutyronitrile was added over a period of 3 hours. After the addition, the resultant mixture was aged at 120° C. for 30 minutes, and a mixture of 0.5 part of azobisdimethyl-valeronitrile and 10 parts of ethylene glycol monobutyl ether was added over a period of 1 hour. The obtained mixture was aged for 1 hour.

Thereafter, 0.02 part of hydroquinone monomethyl ether and 4 parts of glycidyl methacrylate were added and the reaction was continued until the resin acid value decreased by 15. On termination of the reaction, the reaction mixture was diluted with 34 parts of ethylene glycol monobutyl ether, cooled to 40° C. and filtered with a 200-mesh nylon cloth filter.

The obtained reaction product A (hydrophilic side chain moiety of 23,000 in weight average molecular weight) had an acid value of 75, a viscosity of U (Gardner bubble viscometer, 25° C.) and a nonvolatile content of 50%.

Ethylene glycol monobutyl ether (50 parts) was placed in a reactor and heated to 120° C. in a stream of nitrogen. When the temperature reached 120° C., a mixture of 15 parts of styrene, 20 parts of methyl methacrylate, 30 parts of n-butyl acrylate, 20 parts of 2-ethylhexyl methacrylate, 13 parts of 2-hydroxyethyl acrylate, 2 parts of acrylic acid (the polymer of these monomers being used to form the main chain moiety), 208 parts of the above-obtained reaction product A and 2 parts of azobisisobutyronitrile was added over a period of 3 hours. After the addition, the resultant mixture was aged at 120° C. for 30 minutes, a mixture of 0.5 part of azobis-dimethylvaleronitrile and 10 parts of ethylene glycol monobutyl ether was added over a period of 1 hour, and the obtained mixture was aged for 30 minutes. The mixture was then cooled to 70° C. and subjected to, equivalent neutralization with 14.8 parts of dimethyl amino ethanol. Subsequently, the reaction mixture was diluted with 23 parts of ethylene glycol monobutyl ether and filtered with a 200-mesh nylon cloth filter at 50° C. to give an emulsion of neutralized graft resin (A-1) having a viscosity of $Z_4$ (Gardner bubble viscometer, 25° C.) and a nonvolatile content of 50%. This graft resin was 44,000 in weight average molecular weight and 45 in acid value. The ratio by weight of the main chain moiety to the side chain moiety was 50/50.

Preparation Example 2: Preparation of graft resins (A-2), (A-3), (A-4)

Using the monomer components shown in Table 1, side chain moieties were prepared in the same manner as in Preparation Example 1. Each of the obtained moieties was polymerized with the monomer components shown in Table 2 to give graft resins (A-2), (A-3), (A-4).

Table 3 shows the weight average molecular weights and acid values of the graft resins (A-1)–(A-4), weight average molecular weights and acid values of the side chain moieties, and the ratio by weight of the main chain moiety to the side chain moiety.

TABLE 1

| Monomer for side chain moiety | Reaction Product | | |
|---|---|---|---|
| | B (part) | C (part) | D (part) |
| Methyl methacrylate | 21.6 | 28 | 25 |
| n-Butyl acrylate | 48 | 48 | 48 |
| 2-Hydroxyethyl acrylate | 15 | 15 | 15 |

TABLE 1-continued

|  | Reaction Product | | |
|---|---|---|---|
| Monomer for side chain moiety | B (part) | C (part) | D (part) |
| Acrylic acid | 15.4 | 9 | 12 |
| Azobisisobutyronitrile | 2 | 2 | — |
| Octyl mercaptan | — | — | 4 |
| Azobis 2-methyl butyronitrile | — | — | 6 |
| Glycidyl methacrylate | 4 | 4 | 4 |
| Hydroquinone methyl ether | 0.02 | 0.02 | 0.02 |

TABLE 2

| Graft resin | (A-2) (part) | (A-3) (part) | (A-4) (part) |
|---|---|---|---|
| Styrene | 15 | 15 | 15 |
| Methyl acrylate | 20 | 20 | 20 |
| n-Butyl acrylate | 30 | 30 | 30 |
| 2-Ethylhexyl methacrylate | 20 | 20 | 20 |
| 2-Hydroxyethyl acrylate | 13 | 13 | 13 |
| Acrylic acid | 2 | 2 | 2 |

|  | Reaction product | | |
|---|---|---|---|
|  | B 139 | C 312 | D 208 |
| Azobisisobutyronitrile | 1.57 | 2.7 | 2.0 |

TABLE 3

| Graft resin | (A-1) | (A-2) | (A-3) | (A-4) |
|---|---|---|---|---|
| Weight average molecular weight of graft resin | 44,000 | 44,000 | 44,000 | 30,000 |
| Acid value of graft resin | 45 | 50 | 38 | 46 |
| Weight average molecular weight of side chain moiety | 23,000 | 22,500 | 23,500 | 4,000 |
| Acid value of side chain moiety | 75 | 100 | 52 | 75 |
| Main chain moiety/side chain moiety weight ratio | 50/50 | 60/40 | 40/60 | 50/50 |

Preparation Example 3: Preparation of water-soluble acrylic resin (A-5)

Ethylene glycol monobutyl ether (60 parts) and isobutyl alcohol (15 parts) were placed in a reactor and heated to 115° C. in a stream of nitrogen. When the temperature reached 115° C., a mixture of 26 parts of n-butyl acrylate, 47 parts of methyl methacrylate, 10 parts of styrene, 10 parts of 2-hydroxyethyl methacrylate, 6 parts of acrylic acid and 1 part of azobisisobutyronitrile was added over a period of 3 hours. After the addition, the resultant mixture was aged for 30 minutes at 115° C., a mixture of 1 part of azobisisobutyronitrile and 115 parts of ethylene glycol monobutyl ether was added over a period of 1 hour, and the obtained mixture was aged for 30 minutes and filtered with a 200-mesh nylon cloth filter at 50° C.

The obtained reaction product had an acid value of 48, a viscosity of $Z_4$ (Gardner bubble viscometer) and a nonvolatile content of 55%. The reaction product was subjected to equivalent neutralization with dimethyl amino ethanol and deionized water was added to give acrylic resin aqueous solution (A-5) having a nonvolatile content of 50%.

Preparation Example 4: Preparation of hydrophobic melamine resin (B-1)

Melamine (126 parts), 80% paraformalin (225 parts) and n-butanol (592 parts) were placed in a 2-liter 4-necked flask equipped with a thermometer, stirrer and reflux condenser, and the mixture was adjusted to a pH of 9.5–10.0 with a 10% aqueous solution of caustic soda and reacted at 80° C. for 1 hour (melamine resin b-1).

To the reaction mixture was added 888 parts of n-butanol. The resulting mixture was adjusted to a pH of 5.5–6.0 with a 5% aqueous solution of sulfuric acid and reacted at 80° C. for 3 hours. After completion of the reaction, the reaction mixture was neutralized to a pH of 7.0–7.5 with a 20% aqueous solution of caustic soda, subjected to vacuum concentration of n-butanol at 60°–70° C. and filtered to give melamine resin (B-1).

The obtained resin was analyzed and found to have a nonvolatile content of 80%, a solvent dilution ratio of 3.6 (when diluted with a 35/65 water-methanol solvent mixture), and a weight average molecular weight of 800.

Preparation Example 5: Preparation of hydrophobic melamine resin (B-2)

The melamine resin (b-1) obtained in Preparation Example 4 (500 parts) and methanol (320 parts) were placed in a 2-liter 4-necked flask equipped with a thermometer, stirrer and reflux condenser. The reaction system was adjusted to an acid value of 1.0 with formic acid and reacted at 65° C. for 6 hours. On completion of the reaction, the formic acid was neutralized with 1% aqueous solution of caustic soda, the methanol was concentrated in vacuum at 40°–60° C., and the resultant mixture was filtered to give melamine resin (B-2).

The obtained resin was analyzed and found to be a methyl-butyl mixed etherified melamine resin having a nonvolatile content of 70%, a solvent dilution ratio of 17.3 and a weight average molecular weight of 1,400–1,800.

EXAMPLE 1

The hydrophobic melamine resin (B-1) obtained in Preparation Example 4 (20 parts as solids) was placed in a stirring vessel and the graft resin (A-1) obtained in Preparation Example 1 (5 parts as solids) was added. While the mixture was stirred with a dispersing mixer with 1,000–1,500 rpm., 70 parts of deionized water was gradually added. Stirring was continued for further 30 minutes to give aqueous resin dispersion (i) of the present invention having a viscosity of 200 mPa·s (E-type viscometer, 100 rpm.) and containing dispersed particles with an average particle size of 0.13μm.

The average particle size was measured using Coulter Model N4SD (COULTER ELECTRONIC, INC.).

EXAMPLE 2

The hydrophobic melamine resin (B-2) obtained in Preparation Example 5 (20 parts as solids) was placed in a stirring vessel, and the graft resin (A-1) obtained in Preparation Example 1 (5 parts as solids) was added. Thereafter, the procedure of Example 1 was repeated to give aqueous resin dispersion (ii) of the present invention having a viscosity of 238 mPa.s and containing dispersed particles with an average particle size of 0.15μm.

EXAMPLE 3

The hydrophobic melamine resin (B-2) obtained in Preparation Example 5 (20 parts as solids) was placed in a stirring vessel, and the graft resin (A-2) obtained in Preparation Example 2 (5 parts as solids) was added. Thereafter, the procedure of Example 1 was repeated to give aqueous resin dispersion (iii) of the present invention having a viscosity of 240 mPa.s and containing dispersed particles with an average particle size of 0.16μm.

EXAMPLE 4

The hydrophobic melamine resin (B-2) obtained in Preparation Example 5 (20 parts as solids) was placed in a stirring vessel, and the graft resin (A-3) obtained in Preparation Example 2 (5 parts as solids) was added. Thereafter, the procedure of Example 1 was repeated to give aqueous resin dispersion (iv) of the present invention having a viscosity of 230 mPa.s and containing dispersed particles with an average particle size of 0.15μm.

Comparative Example 1

The hydrophobic melamine resin (B-2) obtained in Preparation Example 5 (20 parts as solids) was placed in a stirring vessel, and the graft resin (A-4) obtained for comparison in Preparation Example 2 (5 parts as solids) was added. Thereafter, the procedure of Example 1 was repeated to give comparative aqueous resin dispersion (v) having a viscosity of 240 mPa.s and containing dispersed particles with an average particle size of 0.17μm.

comparative aqueous resin dispersion (vi) having a viscosity of 438 mPa.s and containing dispersed particles with an average particle size of 0.15μm.

Performance Tests

The aqueous resin dispersions obtained in Examples and Comparative Examples were tested for storage stability, thermal stability and mechanical stability by the following test methods.

Storage Stability

The aqueous resin dispersion was allowed to stand at 20° C. for 30 days, and checked for viscosity fluctuation and appearance.

The viscosity fluctuation was determined by subtracting the viscosity after the stability test from the viscosity immediately after preparation (E-type viscometer, 100 rpm., 25° C.).

Thermal Stability

The aqueous resin dispersion was allowed to stand at 40° C. for 10 days, and checked for viscosity fluctuation and appearance. The viscosity fluctuation was determined by the above-mentioned method.

Mechanical Stability

The aqueous resin dispersion was subjected to a circulation test (500 turnovers), and checked for viscosity fluctuation and appearance. The viscosity fluctuation was determined by the above-mentioned method.

The circulation test was conducted under the following conditions: 2 liters in sample amount, 2 liters/min. in flow rate, using an apparatus having a plunger pump manufactured by GRACO Inc. (U.S.), ¼"×5 m pipe, a head pressure of 30 kg/cm² and a back pressure of 5 kg/cm².

The test results are shown in Table 4.

TABLE 4

|  | Examples | | | | Comp. Examples | |
| --- | --- | --- | --- | --- | --- | --- |
|  | 1 | 2 | 3 | 4 | 1 | 2 |
| Aqueous resin dispersion | (i) | (ii) | (iii) | (iv) | (v) | (vi) |
| Storage stability | | | | | | |
| Viscosity fluctuation (mPa · s) | 10 | 10 | 14 | 10 | 90 | 40 |
| Appearance | No abnormality | No abnormality | No abnormality | No abnormality | Separated | No abnormality |
| Thermal stability | | | | | | |
| Viscosity fluctuation (mPa · s) | 16 | 16 | 18 | 15 | 130 | 70 |
| Appearance | No abnormality | No abnormality | No abnormality | No abnormality | Precipitated and separated | No abnormality |
| Mechanical stability | | | | | | |
| Viscosity fluctuation (mPa · s) | 10 | 10 | 10 | 10 | 100 | 25 |
| Appearance | No abnormality | No abnormality | No abnormality | No abnormality | Separated | No abnormality |

Comparative Example 2

The hydrophobic melamine resin (B-2) obtained in Preparation Example 5 (20 parts as solids) was placed in a stirring vessel, and the graft resin (A-5) obtained for comparison in Preparation Example 3 (8 parts as solids) was added. Thereafter, the procedure of Example 1 was repeated to give

We claim:

1. An aqueous resin dispersion prepared by dispersing in an aqueous medium a graft resin (A) and a hydrophobic melamine resin (B), said graft resin (A) having a weight average molecular weight of 10,000 to 100,000 and an acid value of 5 to 80, and consisting of a hydrophobic main chain moiety and a hydrophilic side chain moiety, said hydrophilic side chain moiety being 5,000 to 50,000 in weight average molecular weight and at least 20 in acid value; said hydrophobic melamine resin (B) having a weight average molecular weight of 400 to 5,000, and wherein about 4 to about 40 parts by weight of the resin (A) is used per 20 parts by weight of solids of the resin (B).

2. An aqueous resin dispersion according to claim 1 wherein the ratio (by weight) of the main chain moiety to the side chain moiety in the graft resin (A) is 70/30 to 30/70, based on the combined weight of the two moieties.

3. An aqueous resin dispersion according to claim 1 wherein the hydrophobic melamine resin (B) is up to 20 in solvent dilution ratio when diluted with a water/methanol solvent mixture (35/65 in weight ratio).

* * * * *